United States Patent
Inoko (10) Patent No.: US 9,800,848 B2
(45) Date of Patent: Oct. 24, 2017

(54) ILLUMINATION OPTICAL SYSTEM, IMAGE PROJECTION APPARATUS, AND CONTROL METHOD THEREOF

(71) Applicant: CANON KABUSHIKI KAISHA, Tokyo (JP)

(72) Inventor: Kazuhiro Inoko, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/027,545

(22) PCT Filed: Dec. 3, 2014

(86) PCT No.: PCT/JP2014/006033
§ 371 (c)(1),
(2) Date: Apr. 6, 2016

(87) PCT Pub. No.: WO2015/087512
PCT Pub. Date: Jun. 18, 2015

(65) Prior Publication Data
US 2016/0241825 A1    Aug. 18, 2016

(30) Foreign Application Priority Data

Dec. 11, 2013  (JP) ................................ 2013-255673
Feb. 3, 2014   (JP) ................................ 2014-018348

(51) Int. Cl.
*H04N 9/31*    (2006.01)
*G09G 3/00*    (2006.01)
(Continued)

(52) U.S. Cl.
CPC ......... *H04N 9/3155* (2013.01); *G02B 3/0062* (2013.01); *G02B 7/023* (2013.01);
(Continued)

(58) Field of Classification Search
CPC .............. G03B 21/208; G03B 21/2053; G03B 21/2006; G02B 27/126; G02B 27/096; G02B 27/0933; G02B 27/2264
See application file for complete search history.

(56) References Cited

U.S. PATENT DOCUMENTS 6,540,362 B1 *  4/2003  Janssen ................ H04N 9/3117
                                                    348/E9.027
6,775,048 B1 *  8/2004  Starkweather ......... G02B 6/353
                                                    348/E5.138
(Continued)

FOREIGN PATENT DOCUMENTS

CN     1779515 A     5/2006
CN     101140358 A   3/2008
(Continued)

OTHER PUBLICATIONS

Office Action issued in Chinese Appln. No. 201480066110.6 dated Jan. 24, 2017. English translation provided.
(Continued)

*Primary Examiner* — Sultan Chowdhury
(74) *Attorney, Agent, or Firm* — Rossi, Kimms & McDowell LLP (57) ABSTRACT

The illumination optical system is capable of reducing, without moving any optical member and without causing flicker when displaying a still image, sample-and-hold blur when displaying a moving image. The illumination optical system (20) respectively guides multiple light fluxes (Li, Lii, Liii) from multiple light sources (i, ii, iii) in a light source unit (10) to multiple illumination regions (4a, 4b, 4c) on an illumination surface (4). The illumination optical system includes an integrator optical system (1, 2) located between the light source unit and the illumination surface. The integrator optical system includes a first lens array (1) and a second lens array (2) each including multiple lens cells in
(Continued)

order from a light source unit side. The illumination optical system changes illumination states of the multiple illumination regions depending on changes of states of the light sources.

14 Claims, 8 Drawing Sheets (51) Int. Cl.
*G09G 3/34* (2006.01)
*G03B 21/20* (2006.01)
*G02B 3/00* (2006.01)
*G02B 7/02* (2006.01)
*G02B 19/00* (2006.01)
*G02B 27/12* (2006.01)

(52) U.S. Cl.
CPC ....... *G02B 19/0014* (2013.01); *G02B 27/123* (2013.01); *G03B 21/204* (2013.01); *G03B 21/208* (2013.01); *G03B 21/2013* (2013.01); *G09G 3/002* (2013.01); *G09G 3/342* (2013.01); *G09G 3/3426* (2013.01); *H04N 9/3129* (2013.01); *H04N 9/3164* (2013.01); *G09G 2310/024* (2013.01); *G09G 2310/0237* (2013.01); *G09G 2320/0261* (2013.01); *G09G 2320/0646* (2013.01)

(56) References Cited

U.S. PATENT DOCUMENTS

| | | | |
|---|---|---|---|
| 7,040,761 | B2 | 5/2006 | Okuyama et al. |
| 7,303,288 | B2 | 12/2007 | Miyazawa et al. |
| 7,616,379 | B2 | 11/2009 | Tajiri |
| 8,201,946 | B2 * | 6/2012 | Horikoshi ............ G02B 5/3083 353/20 |
| 8,231,226 | B2 | 7/2012 | Inoue |
| 9,046,750 | B2 | 6/2015 | Matsubara |
| 9,570,017 | B2 | 2/2017 | Yoshida et al. |
| 2002/0186349 | A1 * | 12/2002 | Wichner ................ H04N 9/315 353/29 |
| 2006/0290903 | A1 * | 12/2006 | Inoko ................... G03B 21/208 353/102 |
| 2008/0088566 | A1 | 4/2008 | Chiang et al. |
| 2010/0045936 | A1 | 2/2010 | Inoue |
| 2011/0273367 | A1 | 11/2011 | Cheng et al. |
| 2013/0222772 | A1 | 8/2013 | Matsubara |
| 2014/0063472 | A1 * | 3/2014 | Hung ................... H04N 9/3129 353/97 |

FOREIGN PATENT DOCUMENTS

| | | |
|---|---|---|
| CN | 101196663 A | 6/2008 |
| JP | 11202285 A | 7/1999 |
| JP | H11287987 A | 10/1999 |
| JP | 2000321993 A | 11/2000 |
| JP | 2001350426 A | 12/2001 |
| JP | 2006154025 A | 6/2006 |
| JP | 2006308720 A | 11/2006 |
| JP | 2007148444 A | 6/2007 |
| JP | 2007206725 A | 8/2007 |
| JP | 2008065165 A | 3/2008 |
| JP | 4137162 B2 | 8/2008 |
| JP | 2009116351 A | 5/2009 |
| JP | 2009168977 A | 7/2009 |
| JP | 2010048903 A | 3/2010 |
| JP | 2011022524 A | 2/2011 |
| WO | 2012066654 A1 | 5/2012 |

OTHER PUBLICATIONS

International Search Report issued in Intl. Appln. No. PCT/JP2014/006033 dated Feb. 24, 2015.
Written Opinion issued in Intl. Appln. No. PCT/JP2014/006033 dated Feb. 24, 2015.
Office Action issued in Chinese Appln. No. 201410768542.3 dated Mar. 2, 2017. English translation provided.
Office Action issued in Japanese Appln. No. 2013-255673 dated Aug. 29, 2017.

* cited by examiner

ILLUMINATION OPTICAL SYSTEM, IMAGE PROJECTION APPARATUS, AND CONTROL METHOD THEREOF

TECHNICAL FIELD

The present invention relates to an illumination optical system suitable for, for example, an image projection apparatus such as a projector.

BACKGROUND ART

Projectors typically use a hold-type display element such as a liquid crystal panel as a light modulation element that modulates light according to an image signal. Such a hold-type display element produces so-called sample-and-hold blur (motion blur). The sample-and-hold blur is generated by the following reason. When a viewer observes a moving image displaying a moving object, he/she moves his/her direction of eyes to a direction to which the moving object is predicted to move. On the other hand, the hold-type display element holds displaying a same frame image within one frame period (1/60 second). Thus, the viewer recognizes a difference between a position followed by his/her eyes and a position of the moving object displayed in the moving image as an image blur (sample-and-hold blur).

As a method for reducing such sample-and-hold blur, Patent Document 1 discloses a method of dividing a liquid crystal panel (displaying screen) of a liquid crystal display apparatus into multiple regions in a vertical scanning direction and sequentially turning on and off a backlight for each of the multiple regions so as to restrict an image display time to be near a time of image writing to the liquid crystal panel. This method is well known as a black frame insertion method. Patent Document 2 discloses a method of forming, in a projector, a narrow region where a display element is illuminated with illumination light in a vertical scanning direction and scanning the display element with the illumination light via a rotational prism in the vertical scanning direction so as to reduce the sample-and-hold blur.

CITATION LIST

Patent Literature

[PLT1] Japanese Patent Laid-open No. 11-202285
[PLT2] Japanese Patent Laid-open No. 2006-308720

SUMMARY OF INVENTION

Technical Problem

However, the method disclosed in Patent Document 1 is a method to be applied to a direct-view liquid crystal display apparatus whose backlight is provided near a back of the display element. The method cannot be applied to a projector that illuminates the display element with light from a light source through an optical system including a lens and other optical members.

Moreover, in the method disclosed in Patent Document 2, since the scanning with the illumination light is always performed, flicker is likely to always occur in a displayed image. In particular, the projector needs to display not only a moving image but also a still image for a long time, and thus it is undesirable that the flicker in the display image always occur. In addition, the scanning with the illumination light requires a mechanism to rotate the rotational prism and its peripheral optical members such as mirrors. This results in increase in size of the projector, generation of driving sound (noise) and necessity of maintenance of components such as a motor included in the mechanism.

The present invention provides an illumination optical system capable of reducing, in an image projection apparatus, without moving any optical member and without causing flicker when displaying a still image, the sample-and-hold blur when displaying a moving image. The present invention also provides an image projection apparatus including the illumination optical system.

Solution to Problem

The present invention provides as an aspect thereof an illumination optical system configured to respectively guide multiple light fluxes emitted from multiple light sources included in a light source unit to multiple illumination regions on an illumination surface. The illumination optical system includes an integrator optical system located between the light source unit and the illumination surface. The integrator optical system includes a first lens array and a second lens array each including multiple lens cells in order from a light source unit side. The illumination optical system is configured to change illumination states of the multiple illumination regions depending on changes of states of the light sources.

The present invention provides as another aspect thereof an image projection apparatus including the above illumination optical system, a light modulation element disposed at the illumination surface and configured to modulate light according to an image signal, a projection optical system configured to project the light modulated by the light modulation element, and a controller configured to individually control the states of the light sources so that the illumination states of the illumination regions are individually changed.

The present invention provides as further another aspect thereof a method of controlling an image projection apparatus including a light modulation element configured to modulate light according to an image signal, an illumination optical system configured to respectively guide multiple light fluxes emitted from multiple light sources included in a light source unit to multiple illumination regions of the light modulation element, and a projection optical system configured to project light modulated by the light modulation element. The method includes individually controlling states of the light sources so that illumination states of the illumination regions are individually changed.

Further features and aspects of the present invention will become apparent from the following description of exemplary examples with reference to the attached drawings.

Advantageous Effects of Invention

According to the present invention, the illumination state of each of the illumination regions can be independently changed not by moving an optical member but by changing the state of each of the light source. Therefore, the present invention provides an image projection apparatus that can reduce sample-and-hold blur when displaying a moving image without generating flicker when displaying a still image.

BRIEF DESCRIPTION OF DRAWINGS

FIGS. 3A, 3B, 3C and 3D illustrate FIG. 3 illustrates illumination states of an illumination surface in Example 1.

DESCRIPTION OF EXAMPLE

Exemplary examples of the present invention will be described below with reference to the accompanied drawings.

EXAMPLE 1

Figure 1A:
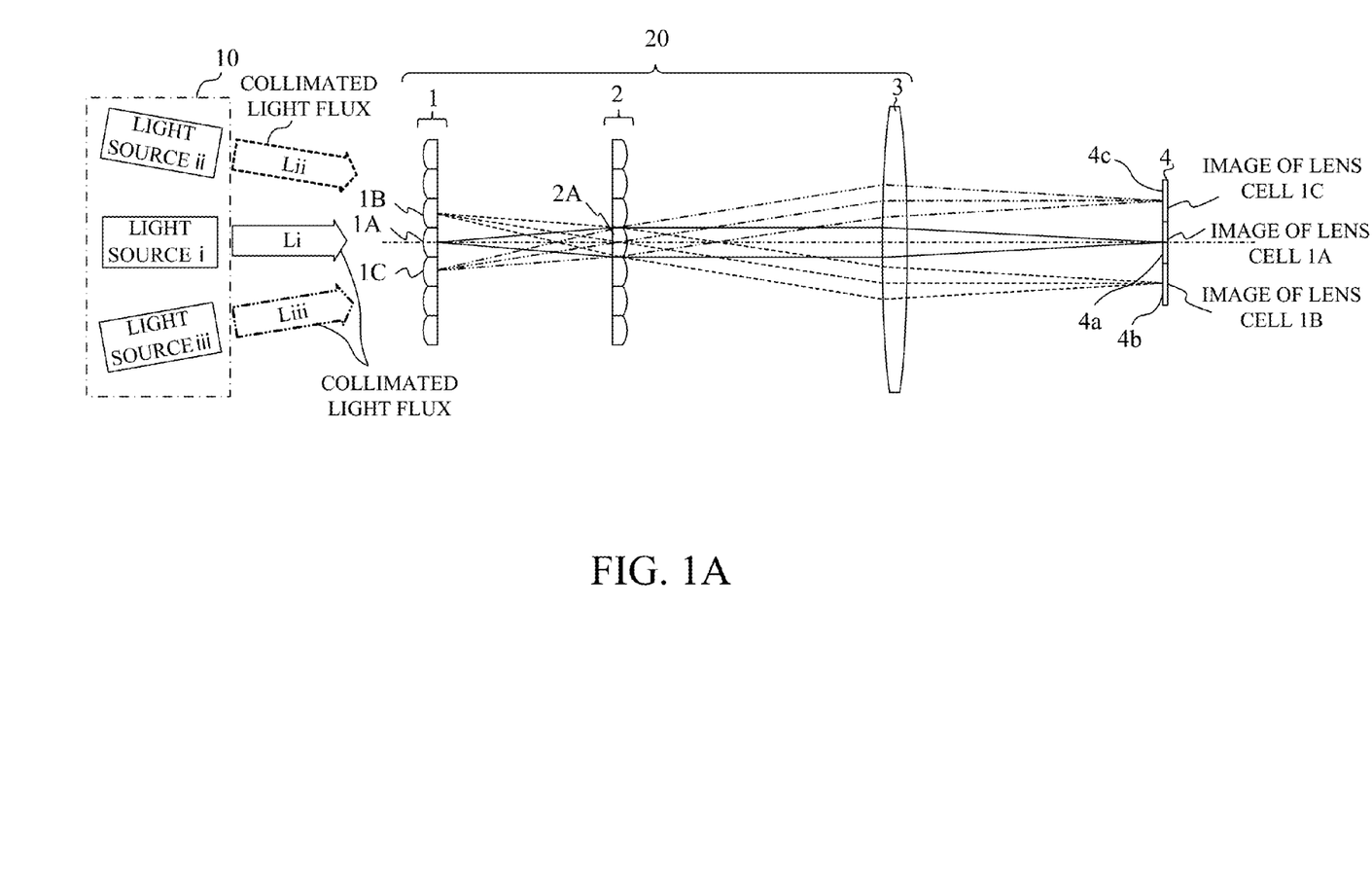
FIGS. 1A, 1B and 1C illustrate a configuration of an illumination optical system that is Example 1 of the present invention.

FIG. 1A illustrates a configuration of an illumination optical system 20 that is a first example (Example 1) of the present invention. The illumination optical system 20 illuminates an illumination surface 4 with multiple light fluxes Li, Lii and Liii emitted from multiple (three, in this example) light sources i, ii, iii which are a first sub unit, a second sub unit and a third sub unit and included in a light source unit 10. The light sources (first, second and third sub units) i, ii and iii may each have one light emitting portion or multiple light emitting portions.

The illumination optical system 20 includes, in order from a light source unit side, a first fly-eye lens (first lens array) 1 and a second fly-eye lens (second lens array) 2 that constitute an integrator optical system. The illumination optical system 20 further includes a condenser lens 3.

Figure 1B:
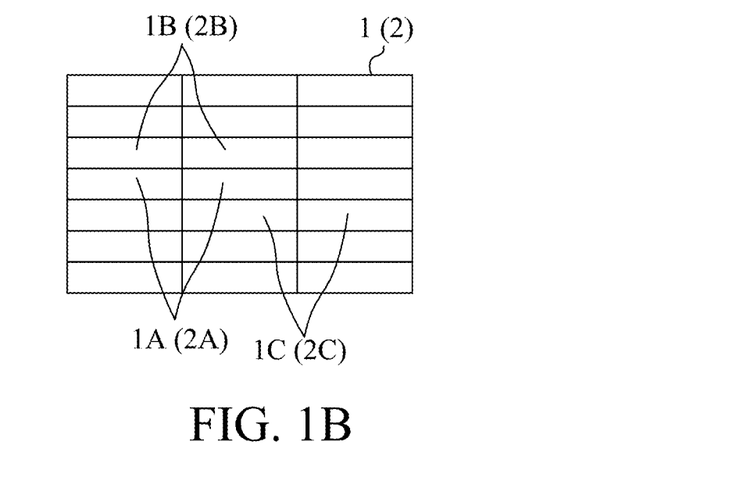

The first and second fly-eve lenses 1 and 2 each includes multiple lens cells as illustrated in FIG. 1B viewing them from a direction of an optical axis (optical axis direction) of the illumination optical system 20. The multiple lens cells are arranged in a vertical direction of FIGS. 1A and 1B and in a horizontal direction corresponding to a depth direction orthogonal to the sheet of FIG. 1A. FIG. 1B illustrates the multiple lens cells including lens cells 1A, 1B and 1C of the first fly-eye lens 1 (and lens cells 2A, 2B and 2C of the second fly-eye lens 2).

The illumination surface 4 has a rectangular shape whose short side extends in the vertical direction and whose long side extends in the depth direction in FIG. 1A. In this example, the illumination surface 4 has multiple (three) illumination regions 4a, 4b and 4c arranged thereon in the vertical direction (short-side direction). Hereinafter, the vertical direction is also referred to as a region division direction. Each lens cell of the first and second fly-eye lenses 1 and 2 has a shape homothetic to that of a corresponding illumination region when viewed in the optical axis direction.

Figure 1C:
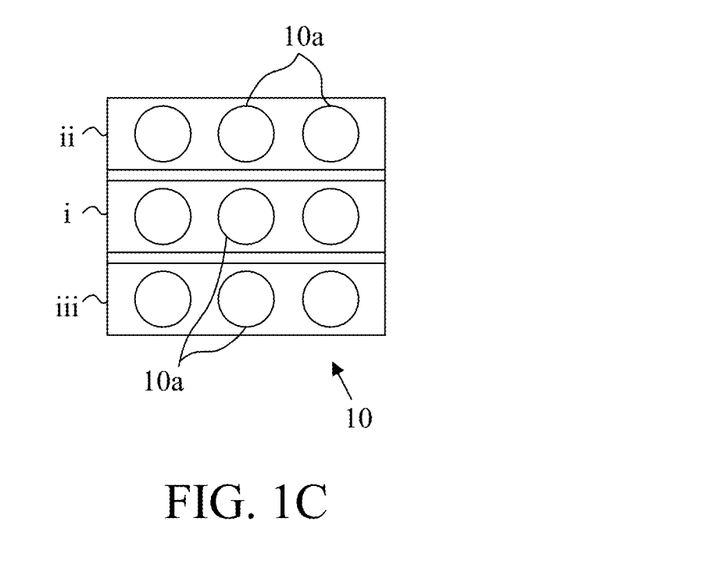

The three light sources i, ii and iii respectively emit collimated illumination light fluxes Li, Lii and Liii. The light sources i, ii and iii each include three light emitting elements 10a arranged in the horizontal direction corresponding to the depth direction of FIG. 1A as illustrated in FIG. 1C viewing the light sources in a direction facing an exiting direction of each light fluxes. The three light emitting elements 10a included in each light source are provided respectively corresponding to three lens cells arranged in the depth direction of FIG. 1A in each of the first and second fly-eye lenses 1 and 2. However, the light source may be constituted by one light emitting element (for example, a surface light emitting element).

The illumination light fluxes Li, Lii and Liii emitted from the light sources i, ii and iii enter each lens cell of the first fly-eye lens 1 at different angles from one another with respect to an optical axis of each lens cell (that is, with respect to the optical axis of the illumination optical system 20) in the vertical direction of FIG. 1A. In other words, the multiple light fluxes Li, Lii and Liii from the light sources (sub units) i, ii and iii enter the first fly-eye lens 1 in the illumination optical system 20 at mutually different angles. As a result, among the illumination light fluxes Li, Lii and Liii emitted from the light sources, three light fluxes passing through an identical lens cell of the first fly-eye lens 1 enter mutually different lens cells of the second fly-eye lens 2. In this example, the illumination light fluxes Li and Lii enter two mutually adjacent lens cells of the second fly-eye lens 2, and, similarly, the illumination light fluxes Li and Liii enter two mutually adjacent lens cells of the second fly-eye lens 2. This will be described later in detail.

The lens cells in the first fly-eye lens 1 have a pitch p therebetween in the region division direction and each have a focal length f. The illumination light fluxes Li, Lii and Liii enter an identical lens cell of the first fly-eye lens 1 with forming an angle $\theta$:

$$\theta = a\tan(p/f)$$

between mutually adjacent illumination light fluxes (that is, between Li and Lii and between Li and Liii). In this example, the illumination light flux Li enters each lens cell along the optical axis thereof, and the illumination light fluxes Lii and Liii enter each lens cell with forming at the angle $\theta$ on mutually opposite sides with respect to the optical axis of each lens cell.

The three illumination light fluxes Li, Lii and Liii entering each lens cell of the first fly-eye lens 1 are condensed (converged) by that lens cell and form light source images on the second fly-eye lens 2. Description will be made of the light source images with reference to FIGS. 2A and 2B.

Figure 2A:
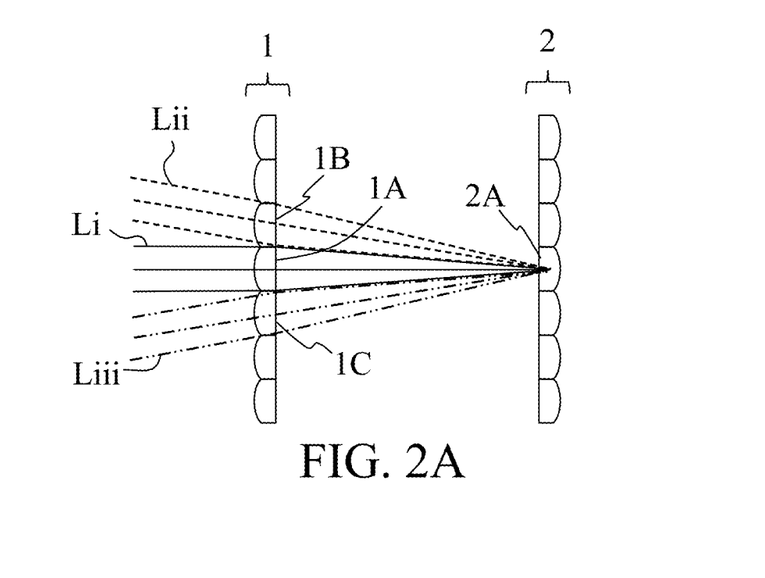
FIGS. 2A and 2B illustrate formation of a light source image through a first fly-eye lens used in Example 1.

FIG. 2A illustrates the light source images formed by the illumination light fluxes Li, Lii and Liii entering one lens cell 2A of the second fly-eye lens 2. Since the illumination light fluxes Li, Lii and Liii enter the first fly-eye lens 1 at mutually different angles, the illumination light fluxes Li, Lii and Liii entering the lens cell 2A of the second fly-eye lens 2 have passed through mutually different lens cells 1A, 1B and 10 of the first fly-eye lens 1. The illumination light flux Li, which is a collimated light flux parallel to the optical axis of the illumination optical system 20, enters the lens cell 1A along the optical axis of the lens cell 1A to be condensed toward the lens cell 2A disposed on this optical axis and forms a light source image on the lens cell 2A. The collimated light fluxes Lii and Liii angled at $\theta$ to the optical axis of the lens cell 1A respectively pass through the lens cells 1B and 1C adjacent to the lens cell 1 A to be condensed toward the lens cell 2A and form light source images on the lens cell 2A.

Figure 2B:
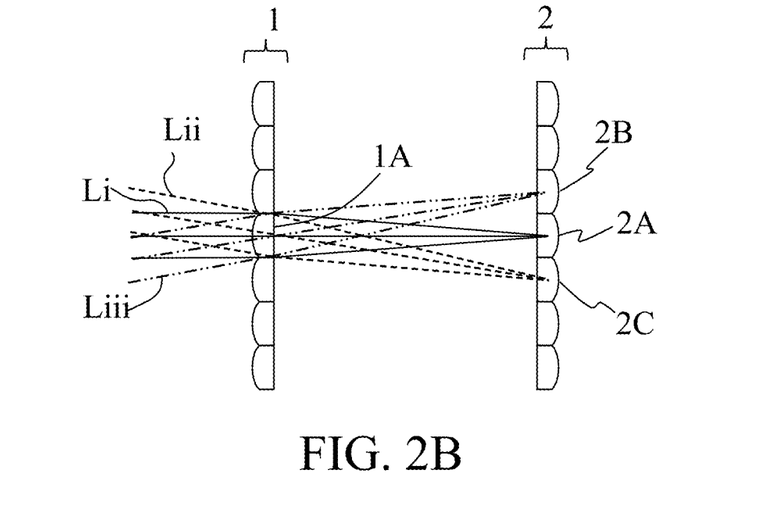

FIG. 2B illustrates light source images formed on the second fly-eye lens 2 by the illumination light fluxes Li, Lii and Liii passing through the lens cell 1A of the first fly-eye lens 1. The illumination light flux Li passing through the lens cell 1A is condensed toward the lens cell 2A of the second fly-eye lens 2 and forms a light source image on the lens cell 2A. The illumination light fluxes Lii and Liii each passing through the lens cell 1A at the angle θ with respect to the optical axis of the lens cell 1A are respectively condensed toward the lens cell 2C and 2B adjacent to the lens cell 2A of the second fly-eye lens 2 and form light source images on the lens cell 2C and 2B. In this manner, in this example, the illumination light fluxes Li, Lii and Liii entering each lens cell of the first fly-eye lens 1 at the mutually different angles reach the mutually adjacent (in other words, mutually different) lens cells of the second fly-eye lens 2 and form the light source images thereon. This is quite different from a fly-eye lens system used for a typical projector in which an illumination light flux passing through one lens cell of a first fly-eye lens enters only a corresponding lens cell of a second fly-eye lens and forms a light source image thereon.

FIG. 1A illustrates that the illumination light fluxes Li, Lii and Liii passing through the mutually adjacent lens cells 1A, 1B and 1C of the first fly-eye lens 1 and through the lens cell 2A of the second fly-eye lens 2, as illustrated in FIG. 2B, respectively form images (that is, the light source images) on the illumination regions 4a, 4b and 4c. The lens cell 2A of the second fly-eye lens 2 and the condenser lens 3 cause the illumination light fluxes Li, Lii and Liii to respectively form images of the mutually adjacent lens cells 1A, 1B and 1C of the first fly-eye lens 1, that is, light source images on the mutually adjacent illumination regions 4a, 4b and 4c of the illumination surface 4. This enables, by changing states of the three light sources i, ii and iii in the light source unit 10, individually changing respective illumination states of the regions 4a, 4b and 4c. The state of the light source includes whether the light source is turned on or off (emits light or does not emit light), and its emission intensity. The illumination state of the illumination region includes whether the region is illuminated or not illuminated (illumination ON or OFF), and its illuminance.

When one of the three light sources i, ii and iii is turned on and the illumination light flux therefrom enters the illumination optical system 20, one of the three illumination regions 4a, 4b and 4c that corresponds to the light source is illuminated (illumination ON). In contrast, when the light source is turned off and the illumination light flux therefrom does not enter the illumination optical system 20, the illumination region that corresponds to the light source is not illuminated (illumination OFF). Moreover, a change of the emission intensity of one of the light sources, that is, light quantity of the illumination light flux therefrom changes the illuminance of the illumination region that corresponds to the light source.

Figure 8:
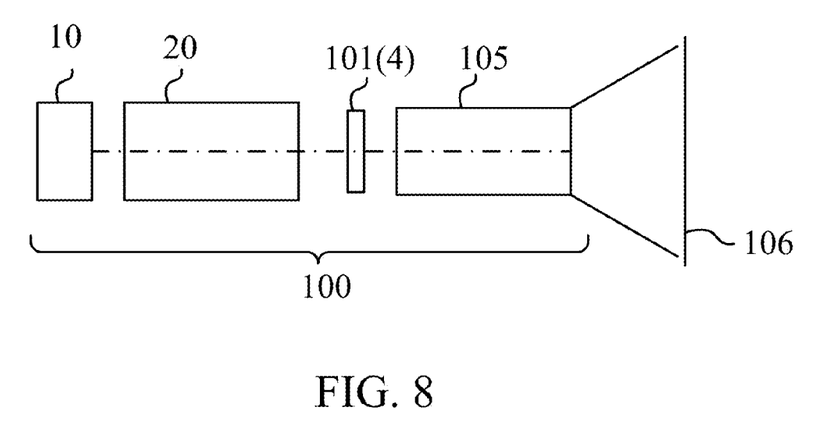
FIG. 8 is a schematic diagram of a projector including the illumination optical system of Example 1.

The light source unit 10 and the illumination optical system 20 thus configured are included in a projector 100 as an image projection apparatus illustrated in FIG. 8. The illumination surface 4 is provided with a light modulation element 101 such as a liquid crystal panel or a digital micro mirror device. An illumination light flux exiting from the illumination optical system 20 and entering the light modulation element 101 (that is, illuminates the light modulation element 101) is modulated by the light modulation element 101. The light modulation element 101 operates according to an image signal input to the projector 100. Modulated light emitted from the light modulation element 101 enters a projection optical system 105 to be enlarged and projected onto a projection surface 106 such as a screen. Thereby, a projected image is displayed on the projection surface 106. The short-side direction of the illumination surface 4 corresponds to a vertical scanning direction of the light modulation element 101, and the long-side direction of the illumination surface 4 corresponds to a horizontal scanning direction of the light modulation element 101. A controller 110 in the projector 100 controls the states of the three light sources i, ii and iii in the light source unit 10 by a control method described below. That is, the controller 110 controls light emission of the light sources i, ii and iii.

Figure 3A:
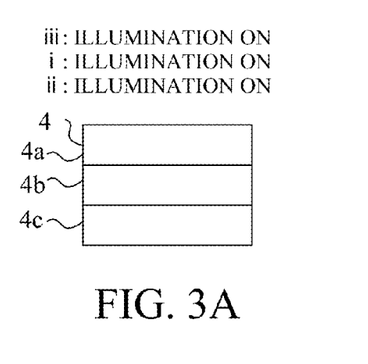

FIGS. 3A to 3D illustrate patterns of switching the illumination state (illumination ON/OFF) of each illumination region on the illumination surface when viewed in the optical axis direction. FIG. 3A illustrates that the three light sources i, ii and iii are all turned on. The three illumination regions 4a, 4b and 4c are all illuminated (illumination ON) respectively by the three illumination light fluxes Li, Lii and Liii emitted from the turned-on light sources i, ii and iii, and thereby the entire illumination surface is uniformly illuminated. This illumination state is suitable for displaying a still image because no flicker of the displayed image occurs in this state.

Figure 3B:
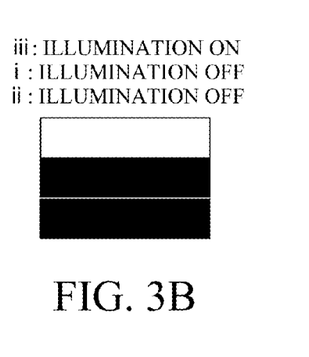
Figure 3C:
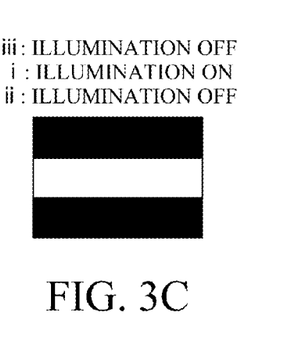
Figure 3D:
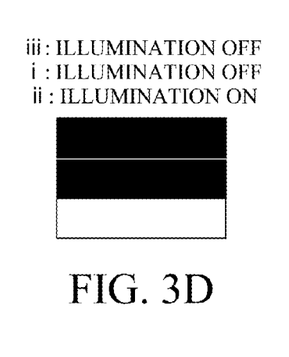

FIGS. 3B to 3D illustrate that part (one, in this example) of the light sources is sequentially turned on and the remaining ones (two) of the light sources are turned off. One of the illumination regions corresponding to the turned-on light source is illuminated (illumination ON), and the two other illumination regions corresponding to the two turned-off light sources are not illuminated (illumination OFF).

In the projector 100 illustrated in FIG. 8, when an image signal of a still image is input, the controller 110 turns on all of the light sources i, ii and iii so as to produce the illumination state illustrated in FIG. 3A. When an image signal of a moving image is input, the controller 110 sequentially changes one turned-on light source and two turned-off light sources among the light sources ii and iii so as to sequentially switch the illumination states illustrated in FIGS. 3B to 3D within one period of a vertical synchronization signal of this image signal. This reduces the above-described sample-and-hold blur and improves moving image display characteristics. The controller 110 can also control the turning on and off of the light sources or emission intensities thereof depending on brightness of the image signal.

A shape error and an assembly error of each fly-eye lens may cause a gap between boundaries of the illumination regions and overlapping thereof. To eliminate this defect, a mechanism may be provided which allows change of position of at least one of the first and second fly-eye lenses 1 and 2 or position of the condenser lens 3 in the optical axis direction or in a direction orthogonal to the optical axis. Such a mechanism can change at least one of position and size of regions where the illumination light fluxes reach on the illumination surface 4, which enables eliminating the gap and overlapping of the illumination regions.

EXAMPLE 2

Figure 4A:
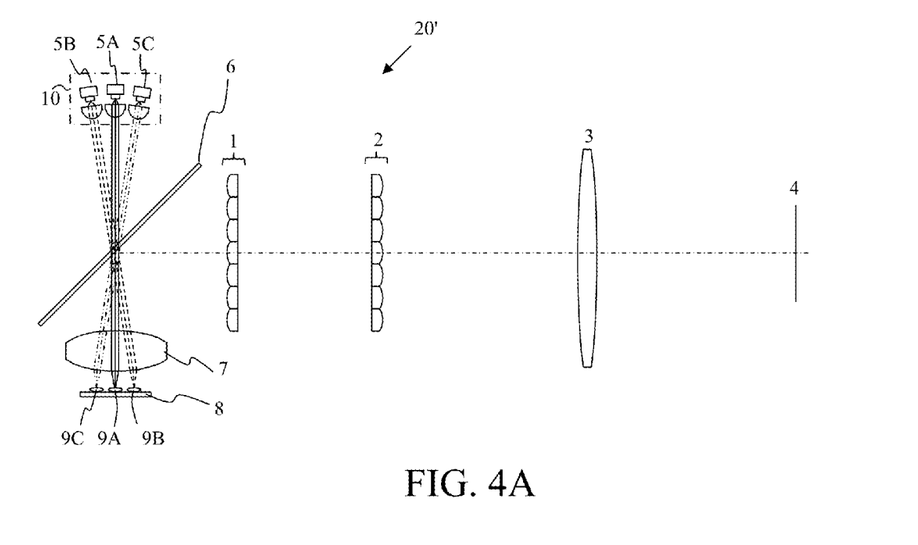
FIGS. 4A and 4B illustrate a configuration of an illumination optical system that is Example 2 of the present invention.
Figure 4B:
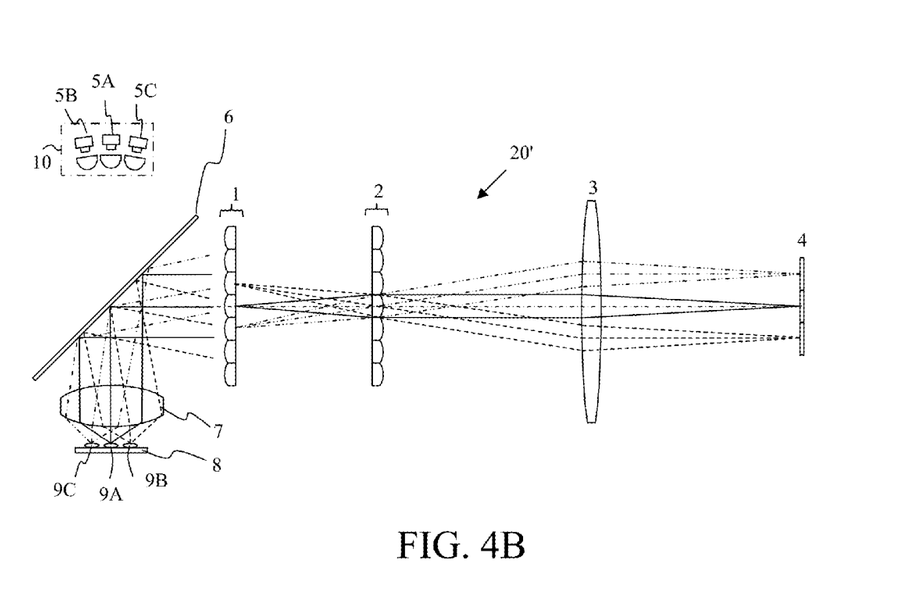

FIGS. 4A and 4B illustrate a configuration of an illumination optical system 20' that is a second example (Example 2) of the present invention. A light source unit 10 includes light sources 5A, 5B and 5C corresponding to the three light sources i, ii and iii described in Example 1. The light sources 5A, 5B and 5C are each constituted by a laser diode and a collimator lens attached to the laser diode. A laser beam as a divergent light flux emitted from each laser diode is converted into a collimated light flux by the collimator lens. The laser beam has a wavelength capable of exciting a fluorescent substance (wavelength conversion element) 8, for example, a ultraviolet wavelength or a blue wavelength.

The illumination optical system 20' of this example includes a dichroic mirror (light guider) 6, a condenser lens 7 and the fluorescent substance 8 between the light source unit 10 and a first fly-eye lens 1. A configuration of a subsequent part to the first fly-eye lens 1 in the illumination optical system 20' is identical to that in Example 1, and thus description thereof will be omitted.

FIG. 4A illustrates light fluxes emitted from the light sources 5A, 5B and 5C to the fluorescent substance 8. A line vertical to a light-receiving surface (horizontal surface in FIG. 4A) of the fluorescent substance 8 is referred to an optical axis of a light source side part of the illumination optical system 20' from a vicinity of the dichroic mirror 6 to the fluorescent substance 8. The light sources 5A, 5B and 5C emit, from top toward bottom of FIG. 4A, collimated light fluxes forming mutually different tilt angles with respect to the optical axis.

The collimated light flux emitted from the light source 5A travels along the optical axis (that is, at a tilt angle of 0 degree) toward the fluorescent substance 8. This collimated light flux emitted from the light source 5A enters, before entering the light-receiving surface of the fluorescent substance 8, the dichroic mirror 6 at an incident angle of 45 degrees and is transmitted therethrough to be condensed by the condenser lens 7. The optical axis of the light source side part of the illumination optical system is made coincident with an optical axis of an illumination surface side part (subsequent part to the first fly-eye lens 1) of the illumination optical system 20' by reflection at the dichroic mirror 6.

The collimated light fluxes emitted from the light sources 5B and 5C travel toward the fluorescent substance 8 with forming same tilt angles on mutually opposite sides with respect to the optical axis. These collimated light fluxes emitted from the light sources 5B and 5C enter, before entering the light-receiving surface of the fluorescent substance 8, the dichroic mirror 6 at a same entering position as that of the collimated light flux from the light source 5A to be transmitted therethrough, are condensed by the condenser lens 7 and then enter the fluorescent substance 8. The collimated light fluxes from the three light sources 5A, 5B and 5C are thus condensed by the condenser lens 7. These collimated light fluxes enter the condenser lens 7 at mutually different angles and therefore form focal points (spots) 9A, 9B and 9C at mutually different positions on the fluorescent substance 8.

The fluorescent substance 8 emits, as illustrated in FIG. 4B, a fluorescence light in response to an entering laser beam as an excitation light. The fluorescence light is condensed by the condenser lens 7 and transmitted therethrough to travel toward the dichroic mirror 6. The dichroic mirror 6 has such a wavelength selectivity that it transmits the laser beam from each of the light sources 5A, 5B and 5C and reflects the fluorescence light (converted light) whose wavelength is converted to a different wavelength from that of the entering laser beam by the fluorescent substance 8. The fluorescence light reflected by the dichroic mirror 6 enters the illumination optical system 20.

The fluorescence lights emitted from the spots 9A, 9B and 9C on the fluorescent substance 8 enter the condenser lens 7 as diffusive light fluxes emitted from the spots 9A, 9B and 9C as secondary light sources. The condenser lens 7 converts the diffusive light fluxes into collimated light fluxes to cause them to exit toward the dichroic mirror 6. Principal rays of these collimated light fluxes travel in same directions as those of the principal rays of the collimated light fluxes emitted from the light sources 5A, 5B and 5C and entering the condenser lens 7 through the dichroic mirror 6. Thus, when entering each lens cell of the first fly-eye lens 1 after being reflected by the dichroic mirror 6, the light flux emitted from the light source 5A becomes a collimated light flux parallel to the optical axis of the lens cell (that is, of the illumination optical system 20'). The light fluxes emitted from the light sources 5B and 5C become collimated light fluxes tilted by a tilt angle θ with respect to the optical axis.

Each light flux traveling from the dichroic mirror 6 toward the first fly-eye lens 1 has a width similar to that of the first fly-eye lens 1. Thus, each light flux traveling from the dichroic mirror 6 and entering the first fly-eye lens 1 is divided by the lens cells of the first fly-eye lens 1.

In this manner, the illumination light fluxes as the three collimated light fluxes entering each of the lens cells of the first fly-eye lens 1 illuminate the three illumination regions on the illumination surface as described in Example 1.

In FIGS. 4A and 4B, each of the light sources 5A, 5B and 5C includes one laser diode, but may include multiple laser diodes so as to increase illuminance of the illumination region.

Between the light sources 5A, 5B and 5C and the dichroic mirror 6, a compression optical system that reduces width of the entering collimated light flux may be disposed. However, the tilt angles of the collimated light fluxes from the light sources 5B and 5C need to be changed corresponding to an angular magnification of the compression optical system.

The dichroic mirror 6 may have a characteristic of reflecting the laser beam and transmitting a fluorescence spectrum.

EXAMPLE 3

Although Example 1 described the configuration that individually illuminates the multiple illumination regions arranged only in the vertical scanning direction of the light modulation element disposed on the illumination surface, a configuration may be employed which individually illuminates multiple illumination regions arranged in both the vertical and horizontal scanning directions of the light modulation element. In other words, the multiple illumination regions may be two-dimensionally arranged on the illumination surface. In this configuration, multiple collimated light fluxes entering each lens cell of the first fly-eye lens include, as with Example 1, the collimated light flux parallel to the optical axis of the lens cell and parallel light fluxes having the same tilt angles on the mutually opposite sides in a direction corresponding to the vertical direction in FIG. 1A with respect to the optical axis. Moreover, the multiple collimated light fluxes entering the lens cell also include collimated light fluxes having tilt angles on mutually opposite sides in each of a direction corresponding to the depth direction orthogonal to the sheet of FIG. 1A and diagonal directions of the lens cell.

Figure 5A:
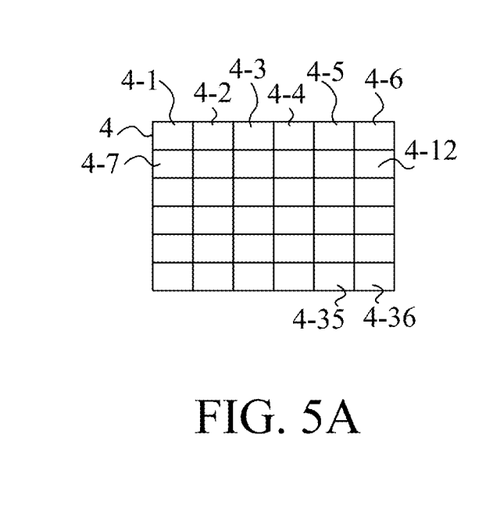
FIGS. 5A, 5B and 5C illustrate illumination states of an illumination surface illuminated by an illumination optical system that is Example 3 of the present invention.

FIG. 5A illustrates 36 illumination regions 4-1 to 4-36 that are two-dimensionally arranged with six regions in each of the vertical scanning direction and the horizontal scanning direction. With this arrangement, number of collimated light fluxes entering each lens cell of the first fly-eye lens 1 and number of light sources that emit these collimated light fluxes are both 36.

In this example, six illumination regions (for example, 4-1 to 4-6, 4-7 to 4-12 and so on) arranged in the horizontal scanning direction are treated as one group, and illumination ON/OFF of six groups of the illumination regions arranged in the vertical scanning direction can be sequentially switched within one period of the vertical synchronization signal. Similarly to Example 1, this example can reduce sample-and-hold blur.

Figure 5B:
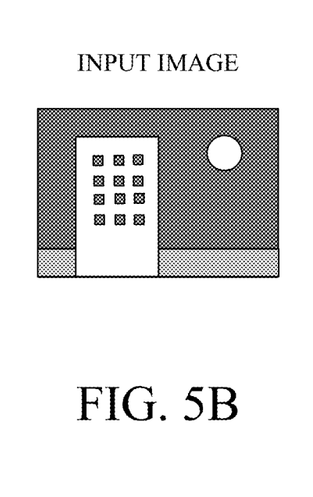

Furthermore, in this example, as illustrated in FIG. 5B, locally illuminating part of the illumination regions or changing brightness (illuminance) of the illumination on the illumination surface 4 can increase contrast of a project image. FIG. 5B illustrates an input image (image signal) in which a full moon in night sky illuminates a white building. An illumination state of the illumination regions for projecting and displaying an image (projected image) corresponding to this input image is illustrated in FIG. 5C.

Figure 5C:
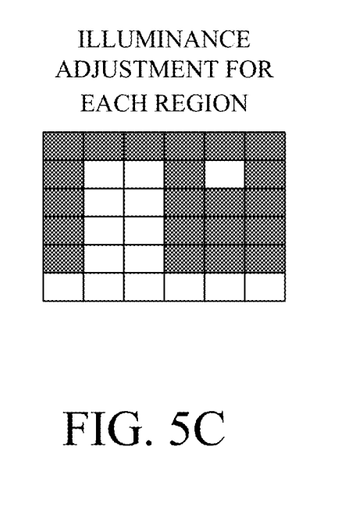

In FIG. 5C, illumination regions corresponding to the full moon and the white building are illuminated (illumination ON) at a high illuminance, and illumination regions corresponding to a ground are illuminated (illumination ON) at a low illuminance. Moreover, illumination regions corresponding to the night sky are not illuminated (illumination OFF). The illumination regions corresponding to the night sky may be illuminated (illumination ON) at an extremely low illuminance.

When such a projected image is displayed in a conventional projector, an optical or electric ghost is adversely produced in a black part representing the night sky, which leads to a lower contrast than that of the input image (image signal). However, when displaying such a projected image, this example analyzes brightness of the input image and locally changes turning on/off of the light sources (that is, entering and not entering of the illumination light fluxes) or emission intensities (light quantities of the illumination light fluxes) according to the analysis result so as to display the projected image at a high contrast.

EXAMPLE 4

Figure 6:
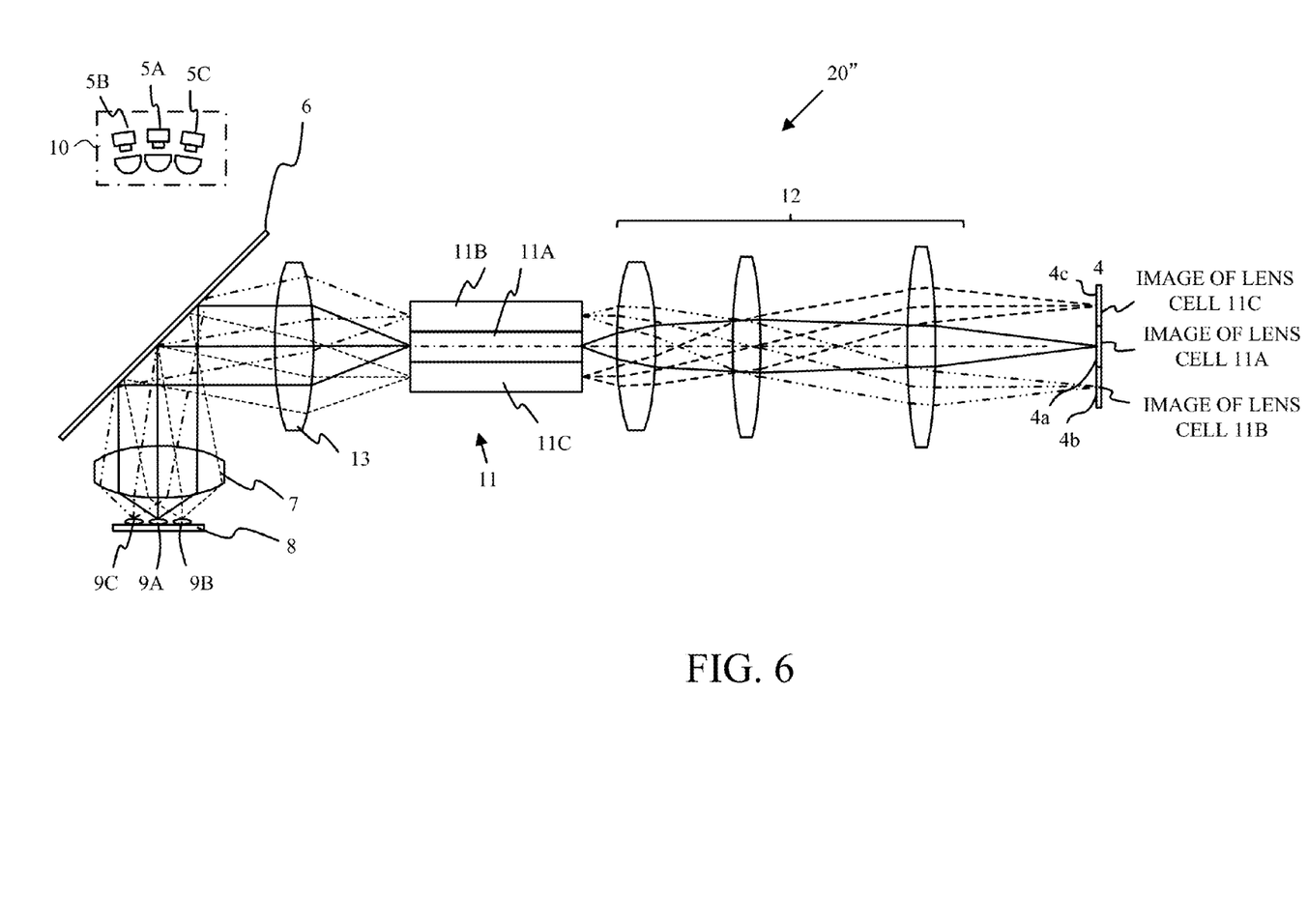
FIG. 6 illustrates a configuration of an illumination optical system that is Example 4 of the present invention.

Next, description will be made of an illumination optical system 20" that is a fourth example (Example 4) of the present invention with reference to FIG. 6. The illumination optical system 20" of this example includes, in order from a light source unit side, a dichroic mirror 6, a condenser lens 7, a fluorescent substance 8, a condenser lens 13, an integrator rod unit 11 as an integrator optical system, and a relay lens unit 12. The light source unit 10 is same as that in Example 2. In addition, a light source side part of the illumination optical system 20" including the dichroic mirror 6, the condenser lens 7 and the fluorescent substance 8 is also same as that in Example 2.

The integrator rod unit 11 divides a light flux entering it into multiple light fluxes (multiple partial light fluxes) depending on number of reflections therein. The multiple partial light fluxes are then superimposed on an illumination surface by a condenser lens disposed closer to an illumination surface 4 than the integrator rod unit 11.

Figure 7:
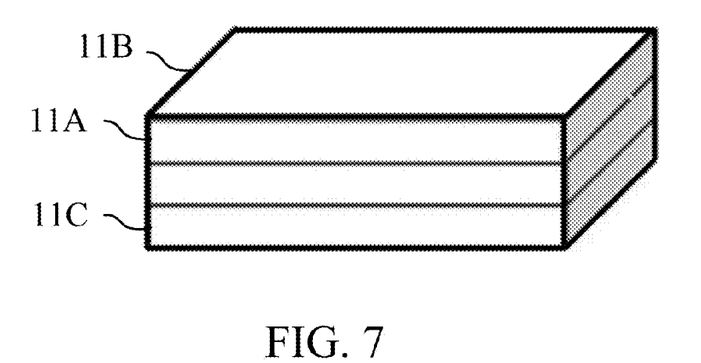
FIG. 7 is a perspective diagram of an integrator rod used in Example 4.

An illumination surface side part of the illumination optical system 20" includes the integrator rod unit 11 and the relay lens unit 12. The integrator rod unit 11 includes, as illustrated in FIG. 7, multiple (three) integrator rods 11A, 11B, 11C arranged in a region division direction (vertical scanning direction of a light modulation element) in which multiple (three) illumination regions 4a, 4b and 4c are divided on the illumination surface 4. Each integrator rod is provided with an entrance surface and an exit surface at ends (in an optical axis direction of the illumination optical system 20") of a rectangular parallelepiped rod portion surrounded by four internal reflective surfaces.

Each integrator rod formed of a light transmissive member such as a glass or plastic member. Mutually adjacent integrator rods (11A and 11B, or 11B and 11C) among the three integrator rods 11A to 11C have therebetween a gap (air layer) of not greater than 100 micrometers (desirably not greater than 20 micrometers, and more desirably 1 to 7 micrometers) therebetween. This gap (layer) is not necessarily filled with air and may be filled with an adhesive or the like using a material having a refractive index sufficiently lower than that of each integrator rod (light transmissive member) as long as a condition for occurrence of internal total reflection in each integrator rod is satisfied.

Three illumination light fluxes (collimated light fluxes) reflected by the dichroic mirror 6 are condensed by the condenser lens 13 and form light source images on the entrance surfaces of the three integrator rods 11A, 11B and 11C. The illumination light flux that forms the light source image on the entrance surface of each integrator rod passes through the rod portion of the integrator rod while being internally reflected thereby and then exits from the exit surface. The illumination light fluxes exiting from the three integrator rods 11A, 11B and 11C pass through the relay lens unit 12 and then reach the mutually different illumination regions 4a, 4b and 4c on the illumination surface 4 to form an image (illuminate them).

Also in this example, sequential switching the states of the three light sources 5A, 5B and 5C of the light source unit 10 within one period of the vertical synchronization signal enables reducing the sample-and-hold blur when displaying a moving image.

The integrator rods, unlike the fly-eye lenses, are difficult to be disposed such that their exit surfaces have no gap therebetween. This may be solved with provision of a mechanism that enables change of position of one or more lenses constituting at least part of the relay lens unit 12 in the optical axis direction. It is desirable to use this mechanism to change at least one of position and size of each of regions where the illumination light fluxes exiting from the three integrator rods 11A, 11B and 11C reach on the illumination surface 4, so as to prevent a gap from being formed between the illumination regions on the illumination surface 4.

Although Examples 2 and 3 described the configuration that uses the laser diodes as the light emitting elements of the light source unit, other light emitting elements such as LEDs may be used instead. Alternatively, when the laser diodes are used, laser beams may be directly entered into the illumination optical system without being mediated through the fluorescent substance.

In each of the examples, the first and second fly-eye lenses 1 and 2 include lens cells having the same shape. Alternatively, the lens cells of the first fly-eye lens 1 may be shaped so as to compress and decenter light fluxes, and the lens cells of the second fly-eye lens 2 may have shapes different from those of the lens cells of the first fly-eye lens 1.

Although Example 4 described the case where the integrator rod has a rectangular parallelepiped shape, the integrator rod may have a shape tapering toward its exit surface.

In each of the examples, number of lenses constituting the condenser lens and the relay lens unit, shapes thereof and arrangement thereof may be changed as appropriate.

Although each of the examples described the case where the illumination optical system is used for the image projection apparatus, the illumination optical system may be used for other apparatuses in which multiple illumination regions on an illumination surface are individually illuminated.

While the present invention has been described with reference to exemplary examples, it is to be understood that the invention is not limited to the disclosed exemplary examples. The scope of the following claims is to be accorded the broadest interpretation so as to encompass all such modifications and equivalent structures and functions.

This application claims the benefit of Japanese Patent Application Nos. 2014-018348, filed on Feb. 3, 2014 and 2013-255673, filed on Dec. 11, 2013 which are hereby incorporated by reference herein in their entirety.

INDUSTRIAL APPLICABILITY

An image projection apparatus having an excellent moving image display characteristic can be provided.

REFERENCE SIGNS LIST 1 first fly-eye lens
2 second fly-eye lens
4 illumination surface
5A, 5B, 5C light source
10 light source unit
20, 20', 20" illumination optical system

The invention claimed is:

1. An illumination optical system configured to respectively guide multiple light fluxes emitted from multiple light sources included in a light source unit to multiple illumination regions on an illumination surface, the illumination optical system comprising:
an integrator optical system located between the light source unit and the illumination surface,
wherein the integrator optical system includes a first lens array and a second lens array each including multiple lens cells in order from a light source unit side,
wherein the illumination optical system changes illumination states of the multiple illumination regions depending on changes of states of the light sources and
wherein the multiple light fluxes emitted from the multiple light sources passing through a same lens cell of the first lens array are guided through multiple lens cells of the second lens array to the multiple illumination regions.

2. The illumination optical system according to claim 1, wherein:
the multiple light sources include a first light source, and
the integrator optical system is configured to divide a light flux emitted from the first light source into multiple partial light fluxes and to superimpose the partial light fluxes with one another on the illumination surface.

3. The illumination optical system according to claim 1, wherein:
the state of the light source represents whether the light source is turned on or off, and
the illumination state of the illumination region represents whether the illumination region is illuminated or not illuminated.

4. The illumination optical system according to claim 1, wherein:
the state of the light source represents an emission intensity of the light source, and
the illumination state of the illumination region represents an illuminance of the illumination region.

5. The illumination optical system according to claim 1, wherein:
the light source unit includes a first sub unit and a second sub unit respectively emitting light fluxes that enter the first lens array at mutually different angles, and
the light flux emitted from the first sub unit and passing through a same lens cell of the first lens array and the light flux emitted from the second sub unit and passing through the same lens cell of the first lens array enter mutually different lens cells of the second lens array.

6. The illumination optical system according to claim 5, wherein the light flux
emitted from the first sub unit and passing through the identical lens cell of the first lens array and the light flux emitted from the second sub unit and passing through the identical lens cell of the first lens array enter mutually adjacent lens cells of the second lens array.

7. The illumination optical system according to claim 1, wherein
each of the lens cells of the first and second lens arrays has a shape homothetic to that of each of the illumination regions.

8. The illumination optical system according to claim 1, wherein:
when a region division direction represents a direction in which the multiple illumination regions are arranged, p represents a pitch between the lens cells of the first lens array in the region division direction, and f represents a focal length of the lens cells, the multiple light fluxes emitted from the multiple light sources enter a same lens cell of the first lens array such that mutually adjacent light fluxes thereamong form an angle $\theta$ given by $\theta = a\tan(p/f)$, and
the multiple light fluxes pass through multiple lens cells of the second lens array which are mutually adjacent in the region division direction to reach the multiple illumination regions.

9. The illumination optical system according to claim 1, further comprising a mechanism that enables change of position of at least one of the
first and second lens arrays,
wherein the change of the position of the at least one of the first and second lens arrays changes at least one of position and size of each of regions where the multiple light fluxes reach on the illumination surface.

10. The illumination optical system according to claim 1, further comprising:
a condenser lens that condenses each of the light fluxes passing through the second lens array; and
a mechanism that enables change of position of the condenser lens,
wherein the change of the position of the condenser lens changes at least one of position and size of each of regions where the multiple light fluxes reach on the illumination surface.

11. The illumination optical system according to claim 1, further comprising:
a multiple wavelength conversion element; and
a light guider that guides the multiple light fluxes emitted from the multiple light sources to the wavelength conversion element and that guides light fluxes exiting from the wavelength conversion element to the first lens array,
wherein the multiple wavelength conversion element converts an entering light into a converted light having a different wavelength from that of the entering light and causes the converted light to exit therefrom.

12. An image projection apparatus comprising:
an illumination optical system configured to respectively guide multiple light fluxes emitted from multiple light sources included in a light source unit to multiple illumination regions on an illumination surface, the illumination optical system comprising:
an integrator optical system located between the light source unit and the illumination surface, wherein the integrator optical system includes a first lens array and a second lens array each including multiple lens cells in order from a light source unit side, wherein the illumination optical system changes illumination states of the multiple illumination regions depending on changes of states of the light sources and wherein the multiple light fluxes emitted from the multiple light sources passing through a same lens cell of the first lens array are guided through multiple lens cells of the second lens array to the multiple illumination regions;

a light modulation element disposed at the illumination surface and configured to modulate light according to an image signal;

a projection optical system configured to project the light modulated by the light modulation element; and a controller configured to individually control the states of the light sources so that the illumination states of the illumination regions are individually changed.

13. The image projection apparatus according to claim 12, wherein:

the illumination regions are arranged in a vertical scanning direction of the light modulation element, and the controller sequentially changes the light sources to be turned on and off within one period of a vertical synchronization signal of the image signal.

14. The image projection apparatus according to claim 12, wherein:

the illumination regions are two-dimensionally arranged in a horizontal scanning direction and a vertical scanning direction of the light modulation element, and the controller individually controls the states of the light sources depending on a brightness of the image signal.

* * * * *